July 31, 1923.
F. STONER ET AL
INTERNAL COMBUSTION MOTOR
Filed Nov. 18, 1919
1,463,231
3 Sheets-Sheet 3
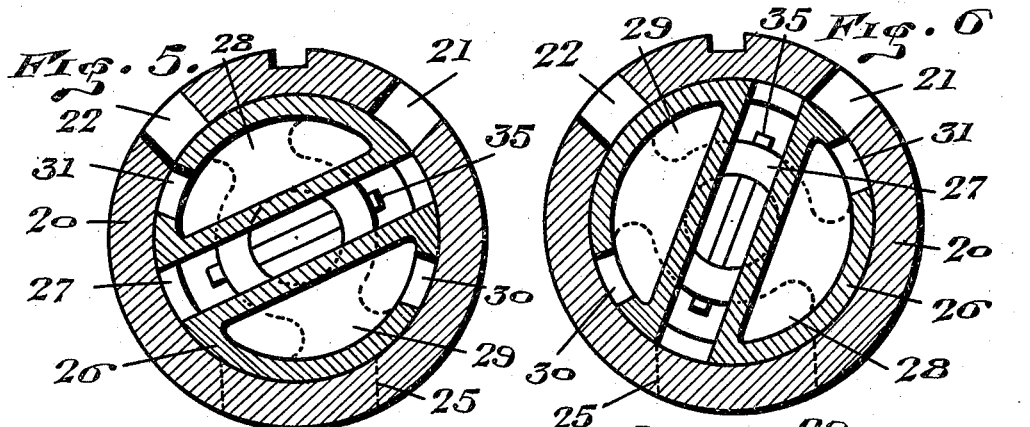
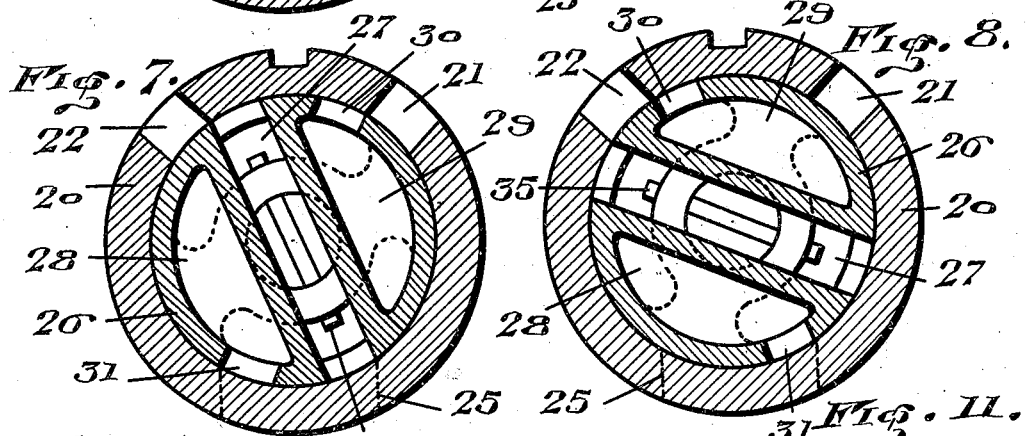
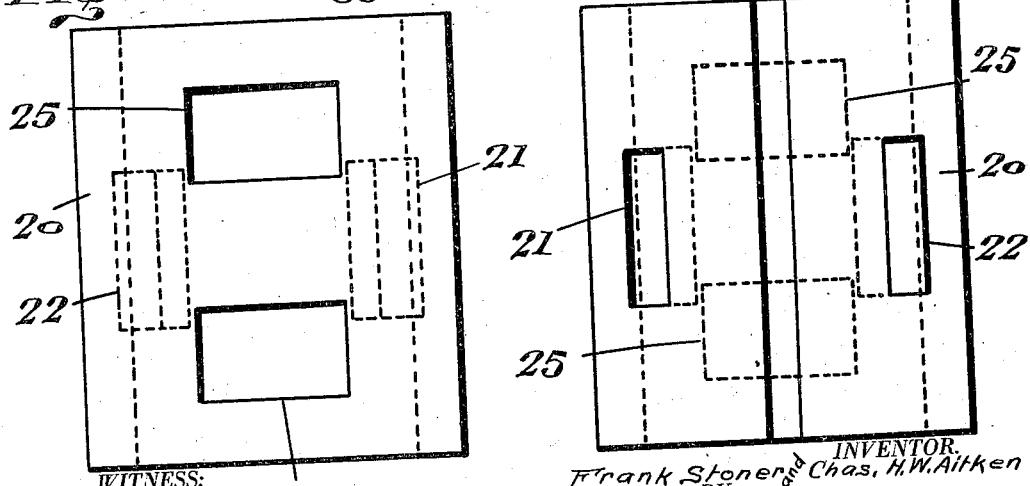
INVENTOR.
Frank Stoner and Chas. H.W. Aitken
BY
Victor J. Evans
ATTORNEY.
WITNESS:
Thos. W. Riley Patented July 31, 1923.

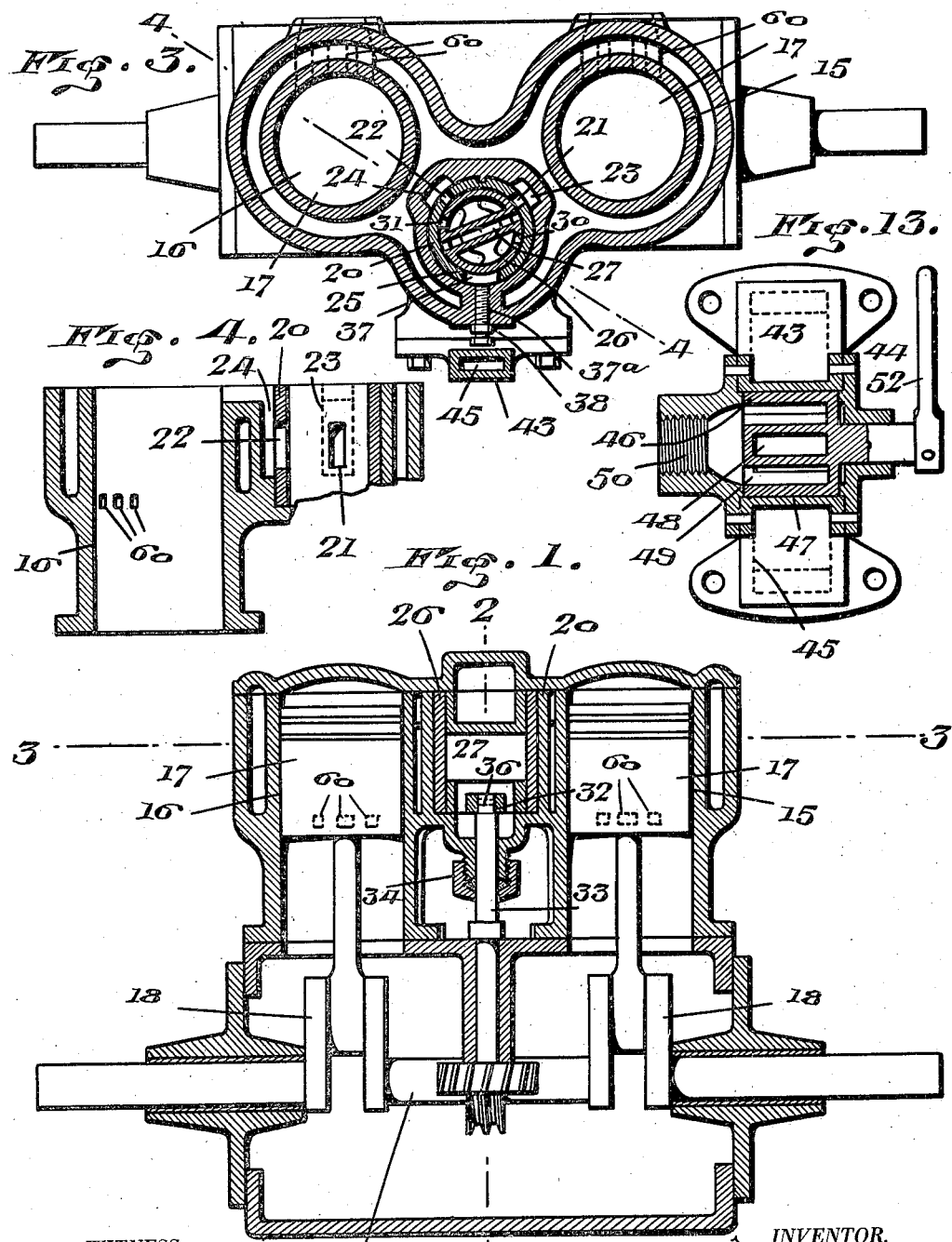

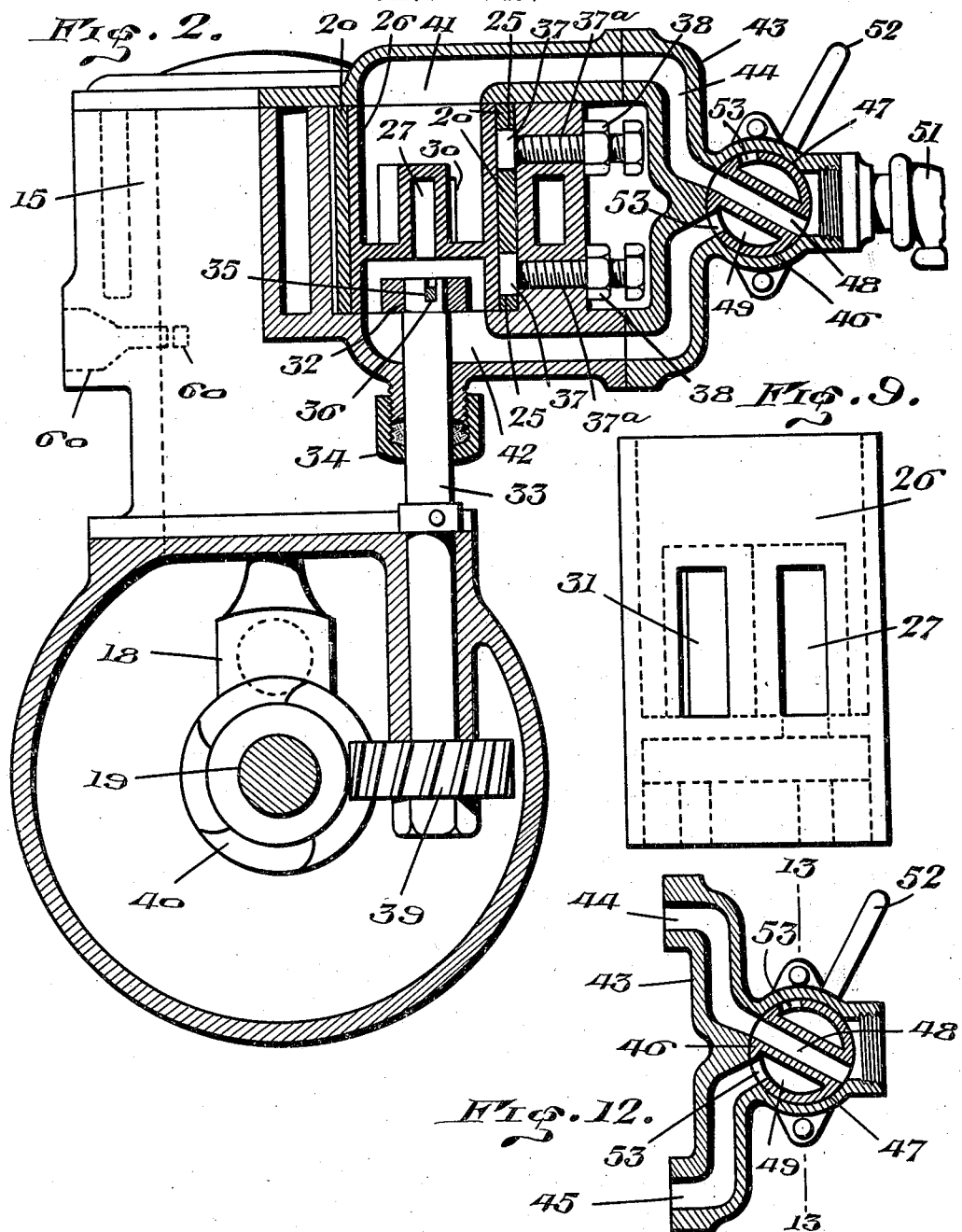

1,463,231

UNITED STATES PATENT OFFICE.

FRANK STONER, OF CORREGIDOR ISLAND, AND CHARLES HENRY WM. AITKEN, OF MANILA, PHILIPPINE ISLANDS, ASSIGNORS TO WILLIAM MAXWELL THEBAUT, OF MANILA, PHILIPPINE ISLANDS.

INTERNAL-COMBUSTION MOTOR.

Application filed November 18, 1919. Serial No. 338,982.

*To all whom it may concern:*

Be it known that we, FRANK STONER and CHARLES H. W. AITKEN, citizens of the United States and Great Britain, respectively, residing at Corregidor Island and Manila, respectively, in the Philippine Islands, have invented new and useful Improvements in Internal-Combustion Motors, of which the following is a specification.

This invention relates to internal combustion engines and has particular relation to the valve mechanism of such engines, the primary object being the reduction of the number of valves employed for the intake and exhaust ports, so as to reduce the working parts to a minimum and to accordingly reduce friction and eliminate thereby the consequent loss of power.

Another object of the invention is the provision of a novel form of valve, whereby a single valve may be employed to control both the intake and exhaust ports.

Another object is the provision of a valve of the rotary type, which eliminates the necessity for springs, the valve being operated directly from the engine crank shaft and rotated to its different positions, so that proper opening and closing of the intake and exhaust ports is assured.

A further object is the provision of a fuel controlled valve, which is especially applicable for use in connection with the first mentioned valve, whereby the direction of flow of the fuel may be controlled to control the direction of travel of the engine.

A further object is the provision of an engine of the above character, which is exceedingly simple in construction and positive and efficient in operation.

Other objects and advantages of the invention will appear as the following description is read in connection with the accompanying drawings.

In the drawings:

Figure 1 is is a sectional view through the internal combustion engine of the two cylinder four cycle type, parts being left out to more clearly show the invention.

Figure 2 is a sectional view on the line 2—2 of Figure 1.

Figure 3 is a similar view on the line 3—3 of Figure 1.

Figure 4 is a fragmentary section on the line 4—4 of Figure 3.

Figures 5, 6, 7 and 8 are detail sectional views, illustrating the different positions of the valve for controlling the intake and exhaust ports during the operation of the engine.

Figure 9 is an elevation of the said valve.

Figure 10 is a side elevation of the valve cage or chamber.

Figure 11 is a similar view looking at the opposite side of the valve cage or chamber.

Figure 12 is a horizontal sectional view illustrating the inlet manifold of the reversing valve.

Figure 13 is a sectional view on the line 13—13 of Figure 12.

Referring to the drawings in detail, there is illustrated a two cylinder engine of the four cycle type, the cylinders being indicated at 15 and 16. Pistons 17 operate within these cylinders and have their rods connected to cranks 18 of a shaft 19, the latter operating within the bearings in the crank case, as will be readily understood. The positions of the cranks 18 differ from the usual type of engine, in that both cranks are in alignment, or extend in the same direction, the purpose being to reciprocate the pistons in the same direction simultaneously, instead of operating alternately, as is usual in explosive engines.

Housed within the engine casting, is a valve chamber or cage 20, which is of cylindrical formation, and is provided with ports 21 and 22, which communicate with ports 23 and 24, respectively, which in turn communicate with the interior of the cylinders 15 and 16. The valve chamber or cage 20 is further provided with ports 25, which are located substantially opposite the ports 21 and 22.

Mounted for rotation within the chamber 20, is a valve 26, which is of hollow cylindrical construction and is provided with a passage 27 extending diametrically therethrough, while chambers 28 and 29 are located upon opposite sides of this passage. These chambers are provided with ports 30 and 31, which are adapted to be brought into register with the ports 21 and 22 in the rotation of the valve and with the ports 25, so as to alternately open and close communication with the interior of the cylinders 15 and 16 through the ports 23 and 24. The valve 20 is formed at one end with a socket 32, which is adapted to surround a vertical disposed shaft 33, the latter being mounted for rotation in suitable bearings provided in the engine casting and surrounded by a packing gland 34 to prevent leakage from the valve chamber 20. The socket 32 has extending there across a diametrically disposed pin 35, which is seated in a notch 36, formed in the end of the shaft 33 and provides a slipping connection between the shaft and valve. It is, therefore, impossible to incorrectly place the valve, it being only necessary to place the pin within the slot or notch 36. Located within the valve chamber and bearing upon the valve 26, are two pressure plates 37, which act to take up any wear due to the operation of the valve. These plates are adjustable through the medium of bolts 37ª and nut locks 38, so that proper pressure may be placed upon the valve to insure its proper operation.

Secured upon the opposite end of the shaft 33, is a worm gear 39, which is engaged and driven by a worm 40, mounted upon the crank shaft. The gear 39 is preferably provided with twenty teeth and the worm 40 with five teeth, so that a ratio of one to four is provided, the crank shaft making four complete revolutions to two complete revolutions of the valve 26.

Communicating with the interior of the valve 26, are passages 41 and 42, the said passages being in communication with an intake manifold 43, through the medium of passages 44 and 45, respectively. These passages 44 and 45 are controlled by a valve 46, which will be hereinafter referred to as the reversing valve. This valve is also of hollow cylindrical shape and rotates within the chamber 47 which communicates with the passages 44 and 45. The reversing valve 46 is provided with a central passage 48, upon each side of which are located chambers 49 for communication with the atmosphere through the medium of an outlet 50. Extending from the intake manifold 43, is a suitable connection 51, to which may be connected a carburetor (not shown) of any suitable type. The passage 48 in the reversing valve 46 is adapted to be moved into communication with either of the passages 44 or 45, by means of a hand operated lever 52. The reversing valve 46 is further provided with ports 53, located upon opposite sides of the passage 48, and as shown in Figure 2, when the last mentioned passage is in communication with the passage 44, one of the ports 53 will be in passage with the other port 45.

In the operation of the engine, the cylinders fire alternately, as is usual in internal combustion engines, the operation being as follows: Gas is fed from the carburetor through the passage 48 of the reversing valve 26 to the cylinders of the engine. Both pistons move downward and upward simultaneously, while the explosions occur alternately, both being at the limit of the inner stroke starting upward. The valve 26 will then be in the position shown in Figure 5, cylinder 15 exhausting through 23, 21, 27, 45, 53 and 50 to the atmosphere. Cylinder 2 then starts on the compression stroke with the valve 26 covering port 22, which leads through the port 24 to cylinder 16. When the pistons arrive at the limit of the outer stroke, cylinder 15 has entirely exhausted the exploded gases and cylinder 16 has reached full compression and is ready for firing. When this occurs the valve 26 is in the position shown in Figure 6. After firing the pistons start downward and cylinder 15 sucks in the fresh charge of fuel through the carburetor, the passage 48 of the reversing valve 46, the passage 44 of the intake manifold 43, the port 30, the port 21 and the port 23 to cylinder 15. When the pistons again reach the inner limit of the stroke, the valve 26 is in the position shown in Figure 7. The pistons again move upward or outward with the ports 21 and 23 closed to cylinder 15. During this upward movement the cylinder 16 will exhaust through the ports 24, 22, 27, 42, 53 and 50 to the atmosphere. When the piston again arrives at the limit of the outer stroke, the valve 26 is in the position shown in Figure 8, cylinder 15 being again ready to fire. When this occurs the pistons move downward and cylinder 16 takes in a fresh charge through the ports 48, 44, 30, 22 and 24. This completes the four strokes of the cycle of the operation, the crank shaft having made two complete revolutions, while the valve 26 has made only one.

To reverse the direction of operation of the engine, the lever 52 is operated to rotate the reversing valve, so that the passage 48 will communicate with the passage 45, and one of the ports 53 with the passage 43. The fuel exhaust gases will then enter and leave the cylinders in an opposite direction from that above explained, so that a reverse motion of the engine is obtained. As the explosions occur in one or other of the cylinders the exhaust always takes place at the end of the inner or bottom stroke of the pistons through the ports 60 provided in each of the engine cylinders. This reduces the charge in the cylinders to atmospheric pressure and leaves only the burnt charge to be expelled through valve 20 to the atmosphere and thereby entirely empties the cylinders, leaving them ready for a full charge of fresh fuel.

The invention is susceptible of various changes in its form, proportions and minor details of construction and the right is herein reserved to make such changes as properly fall within the scope of the appended claims.

Having described the invention, what is claimed is:

1. The combination with a multiple cylinder engine having spaced fuel passages and means for alternately opening and closing said passages at one end thereof, of a valve chamber arranged at the opposite end of the spaced fuel passages and in communication therewith, said fuel passages entering the chamber from the same side, a hollow cylindrical reversing valve mounted for rotation in said chamber and provided with a centrally disposed passage, one end of which is adapted to be registered with either of the spaced fuel passages, while the opposite end is in constant communication with the intake manifold of the engine, a pair of chambers D-shaped in cross section, one of which is arranged on each side of the centrally disposed passage, said chambers are provided with ports alternately registering with either of the spaced fuel passages when the centrally disposed passage is in communication with the other spaced fuel passage and a manually operated lever for rotating the valve for changing the action of the engine.

2. In a multiple cylinder engine embodying a casing, a valve cage within the casing, a cylindrical valve rotatably mounted within a cage and having a socket formed on its bottom side, a vertically disposed shaft mounted for rotation in the casing and having a notch in one end thereof, said shaft being arranged in said socket, a pin seated in said notch to provide a slip connection between the shaft and the valve, a worm gear secured upon the opposite end of the shaft, a worm surrounding the crank shaft of the engine and adapted to mesh with the teeth of the worm gear for the purpose specified and means for reversing the rotations of the cylindrical valve.

In testimony whereof we affix our signatures.

FRANK STONER.
CHARLES HENRY WM. AITKEN.